Sept. 28, 1926.

A. W. CARROLL 1,601,107

LOCOMOTIVE VALVE GEAR

Filed Dec. 30, 1924    5 Sheets-Sheet 1

Inventor
ALEXANDER W. CARROLL.
By His Attorney
Cornelius C. Billings

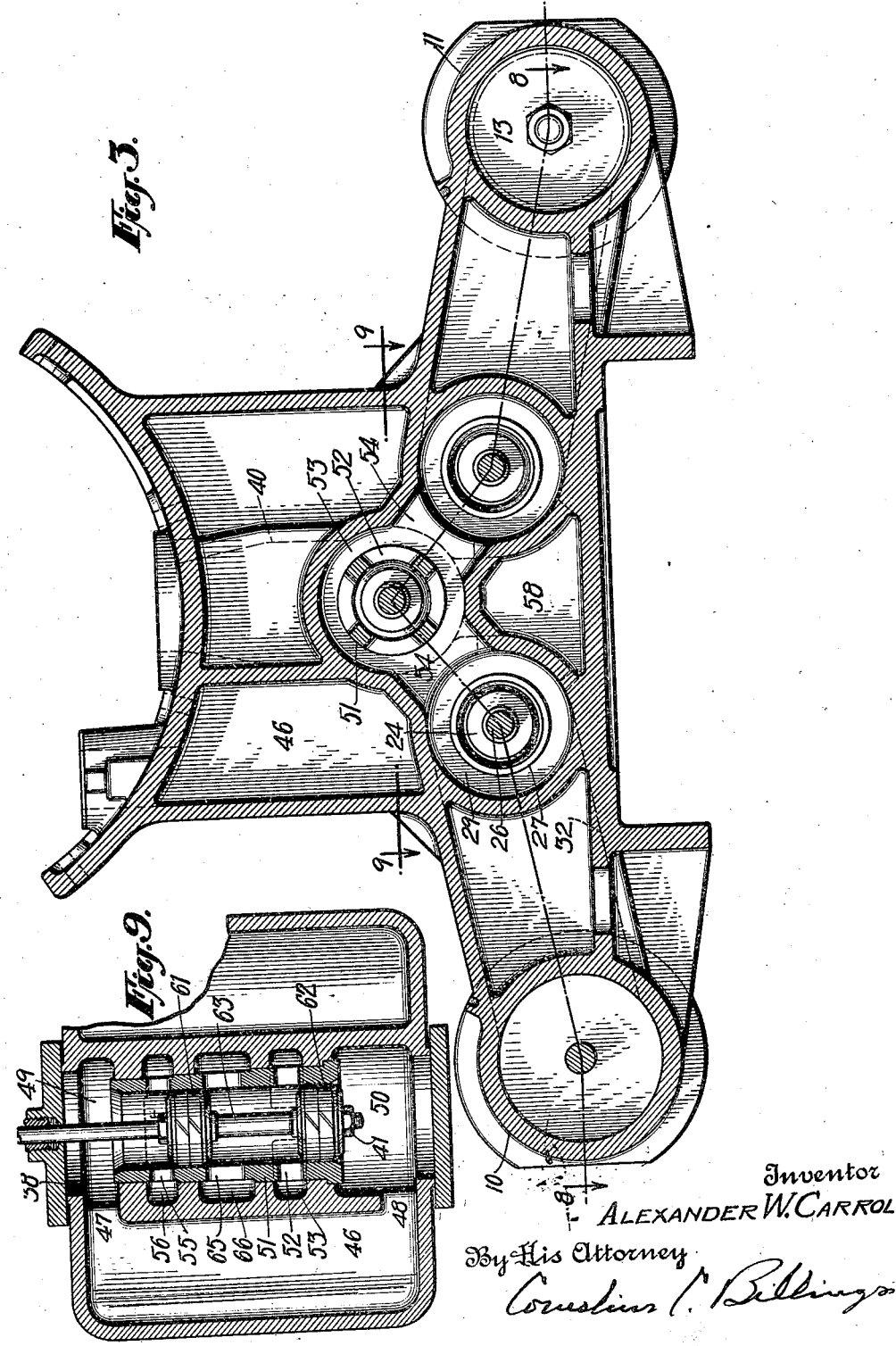

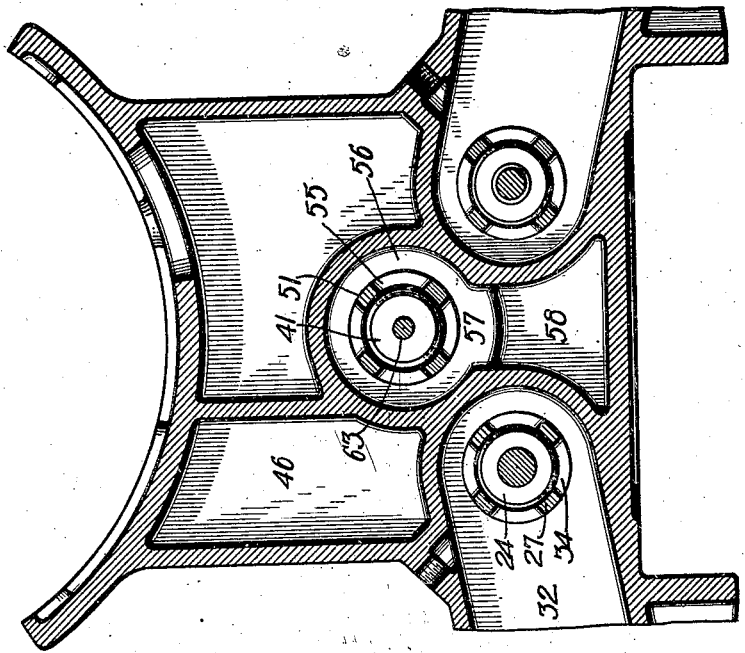
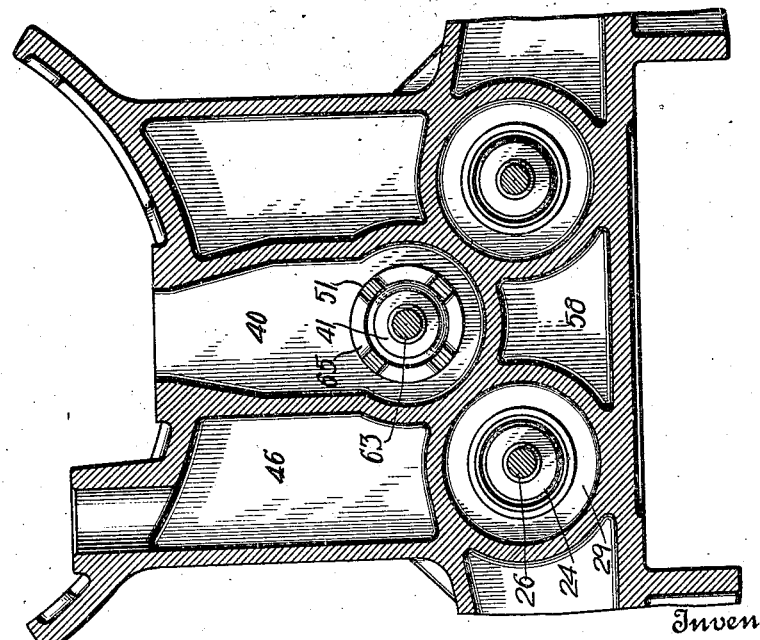

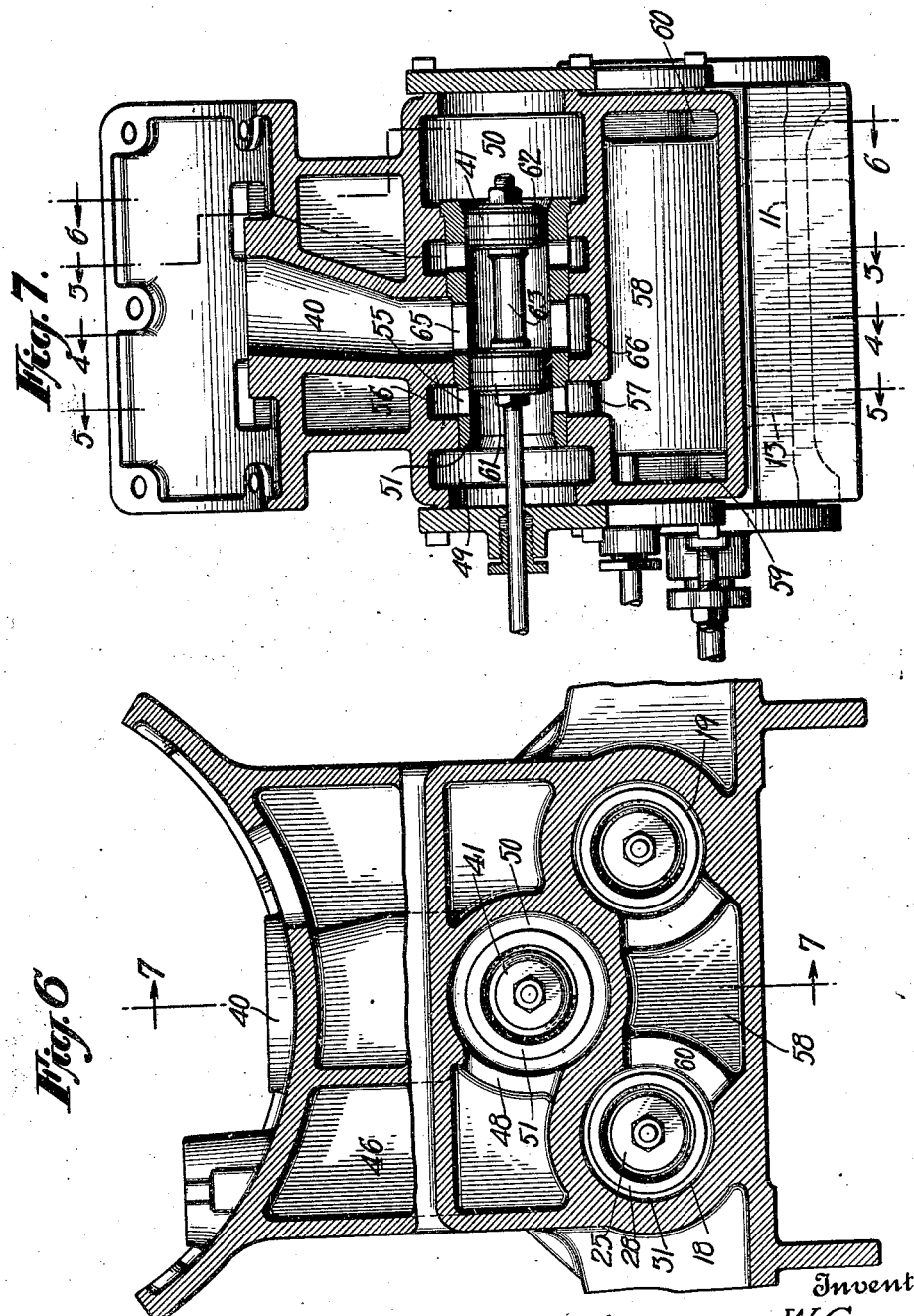

Sept. 28, 1926.

A. W. CARROLL 1,601,107

LOCOMOTIVE VALVE GEAR

Filed Dec. 30, 1924    5 Sheets-Sheet 5

Fig. 8.

Inventor
ALEXANDER W. CARROLL
By His Attorney
Cornelius C. Billings

Patented Sept. 28, 1926.

1,601,107

UNITED STATES PATENT OFFICE.

ALEXANDER W. CARROLL, OF ELIZABETH, NEW JERSEY.

LOCOMOTIVE VALVE GEAR.

Application filed December 30, 1924. Serial No. 758,791.

This invention relates to a locomotive valve apparatus and, more particularly, to valve apparatus for locomotives for switching and local use about industrial plants.

In the usual type of locomotive valve gears, the direction of movement of the locomotive is controlled by the valve gear mechanism, which is also designed to so time the admission and cut-off of steam as to utilize the full expansive force of the steam when the locomotive is in motion or on a long haul. This involves the use of a number of moving parts of considerable complexity. In small locomotives for local hauls and switching about industrial plants, in which the locomotive is started and stopped at frequent intervals, the full utilization of the expansion power of the steam after the locomotive is in motion is not important. In such locomotive, simplicity and a minimum number of moving elements are desirable, not only because of the lower cost of the locomotive but also because fewer opportunities are afforded to the locomotive to get out of order, and less skill and care are required in its operation and repair.

An object of my present invention is to provide a simple valve apparatus having a minimum of moving elements and capable of placing a locomotive in forward or reverse movement and having a minimum of moving parts.

Another object of the invention is to provide a reversing device which will permit the reversal of movements of a locomotive having a simple eccentric actuated slide valve mechanism.

A further object of the invention is to provide a compact apparatus by which the steam and exhaust connections of a slide valve, driven from an eccentric on a drive shaft or other suitable means, may be reversed to reverse the direction of driving of the engine.

With these and other objects in view, the invention comprises the locomotive valve mechanism described and set forth in the following specification and claims.

Figure 1:
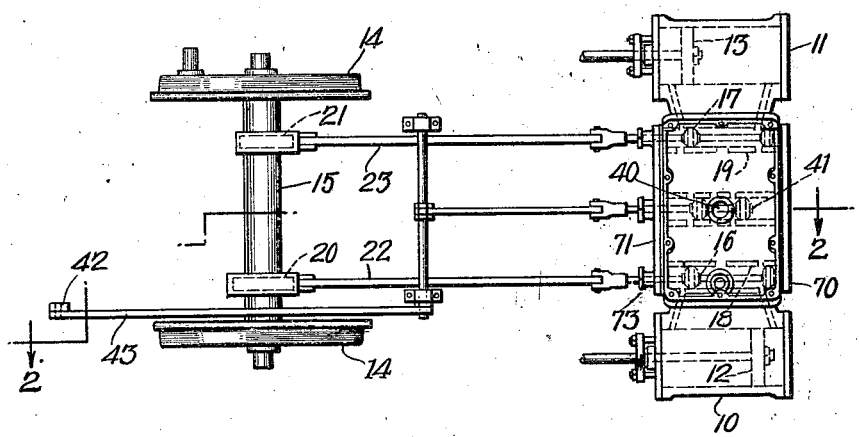
Figure 2:
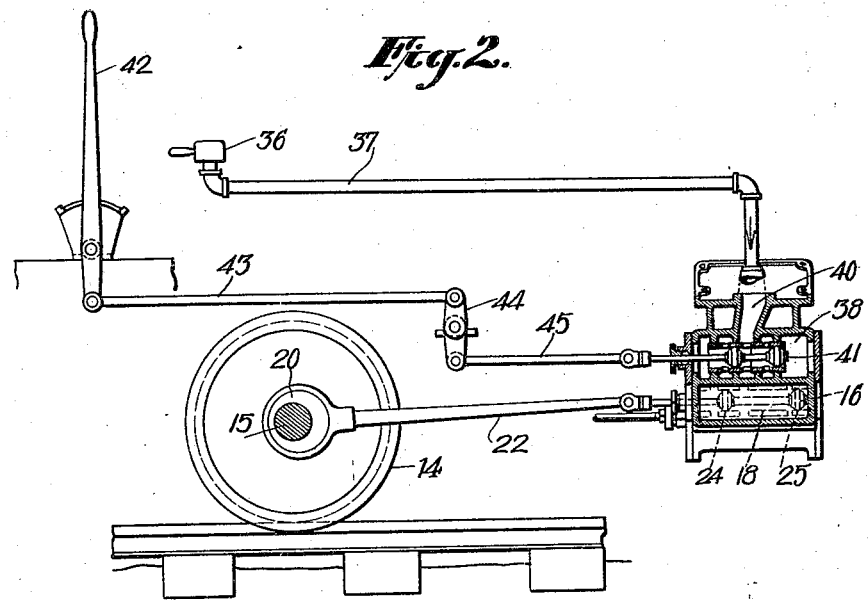

The various features of the invention are illustrated in the accompanying drawings in which:

Fig. 1 is a diagrammatic plan view, partly in section, of a valve apparatus embodying a preferred form of the invention, Fig. 2 is a diagrammatic sectional view of the apparatus taken on line 2—2 of Fig. 1, Fig. 3 is a vertical cross sectional view of the valve apparatus taken on line 3—3 of Figs. 7 and 8, Fig. 4 is a vertical cross sectional view of the valve apparatus taken on line 4—4 of Figs. 7 and 8, Fig. 5 is a vertical cross sectional view of the apparatus taken on line 5—5 of Figs. 7 and 8, Fig. 6 is a vertical cross sectional view of the apparatus taken on line 6—6 of Figs. 7 and 8, Fig. 7 is a vertical longitudinal sectional view of the apparatus taken on line 7—7 of Fig. 6, Fig. 8 is a horizontal longitudinal view of the apparatus taken on line 8—8 of Fig. 3, and Fig. 9 is a horizontal sectional view of the apparatus taken on line 9—9 of Fig. 3.

In my present invention, the admission, cut-off, and exhaust of steam to and from the engine cylinders are controlled by a slide valve actuated from the driving shaft of the locomotive by means of an eccentric or equivalent means, and, when its steam inlet and exhaust connections are fixed, capable of driving the locomotive in a single direction only. The reversal of the direction of movement of the locomotive is obtained by reversing the connections of the steam and exhaust ports. For this purpose, a reversing or control valve is provided with such connections to the inlet and exhaust ports of the slide valve and to the steam supply and exhaust of the locomotive that, when it is in one position, the steam supply is connected to the steam inlet of the slide valve and the exhaust port of the slide valve is connected to the exhaust nozzle, to drive the locomotive forwardly, and, when it is in another position, the steam supply is connected to what, in the other position, was the exhaust port of the slide valve and the former inlet port of the slide valve is connected to the exhaust nozzle, so that, in the same positions of the slide valve, the steam is admitted to the opposite ends of the driving cylinders from that in the forward movement, and the locomotive is therefore driven in the reverse direction.

Referring more particularly to the accompanying drawings, the invention is illustrated as applied to a locomotive of a usual type having a pair of cylinders 10 and 11 in which reciprocate pistons 12 and 13 connected respectively to driving wheels 14 on a shaft 15 of the locomotive. The admission of steam to the cylinders 10 and 11 and the exhaust therefrom are controlled by means of slide valves 16 and 17, reciprocating in valve chambers 18 and 19, respectively, and driven from the shaft 15 by means of eccentrics 20 and 21 and connecting rods 22 and 23, respectively. The invention may be applied to valves of any suitable construction, cylindrical valves being shown by way of example, each comprising a pair of pistons 24 and 25 mounted in spaced positions on a rod 26 and slidable in fixed sleeves 27 and 28 mounted in the valve chambers between a central chamber or compartment 29 forming the interior of the valve and end compartments 30 and 31 at the exterior of the valve. As the valves reciprocate to their rearmost or forward positions in the sleeves 27 and 28, the opposite end portions of the cylinders 10 and 11 are placed in communication, through passages 32 and 33 and through ports 34 and 35 in the sleeves 27 and 28, respectively, alternately with the central compartment 29 and the end compartment 30 or 31.

A valve gear of this type with steam supplied constantly to a fixed inlet and the exhaust constantly taken from a fixed outlet provides the admission and cut-off of steam and the opening and closing of the exhaust ports in proper sequence but does not provide a means for reversing the movement of the locomotive. For example, in the arrangement illustrated and described above, when steam is supplied to the central compartment 29 or the interior of the valve and the end compartments 30 and 31 or exterior of the valve are in communication with the exhaust, the engine is driven forwardly, while, if the end compartments 30 and 31 are connected to the steam supply and the central compartment 29 to the exhaust, the engine is driven in the reverse direction.

In my present invention, means are provided for reversing the engine or locomotive by reversing the connection between the valve ports and the steam supply line and the exhaust nozzle. For this purpose, steam supplied through the usual throttle valve 36 and steam line or pipe 37 passes to a control, or reversing, valve chamber 38 from which it is supplied either to the central compartment 29 of the valve cylinders 18 and 19 or to the end compartments 30 and 31, and the exhaust is correspondingly directed either from the end compartments 30 and 31 or from the central compartment 29 through the valve chamber 38 to an exhaust nozzle 40. The connections of the steam supply and of the exhaust through the valve chamber 38 to the ports of the valve chambers 18 and 19 are controlled by means of a slide valve 41 which is moved to the proper control positions in the valve chamber 38 by a lever 42 in the cab of the locomotive and connected to the valve through a connecting rod 43, lever 44, and connecting rod 45. Thus, in the arrangement shown in the accompanying drawings, when the valve 41 is in its forward position, steam is supplied through the valve chamber 38 to the outer compartments 30 and 31 of the valve chambers 18 and 19, and the central compartments 29 of the valve chambers 18 and 19 are in communication with the exhaust nozzle 40 and the locomotive is driven in reverse. When the valve 41 is in its rearward position the steam is supplied to the central compartments 29 or interior of the valve and the end compartments 30 and 31 or exterior of the valve are connected to the exhaust nozzle and the locomotive is driven forwardly.

In the arrangement and construction of the valve chamber and connecting passageways shown in the accompanying drawings, the steam supplied through the pipe 37 is received in a chamber 46 extending lengthwise at one side of the chamber and communicating through ports 47 and 48 at its opposite ends, Figs. 6 and 7, with compartments 49 and 50 positioned at the ends of, and opening into a central sleeve 51 which forms a chamber for the control or reversing valve 41. The compartments 49 and 50 are thus always supplied with steam and in turn supply steam to the end portions of the cylinder 51 from which it may be directed to either the central compartment 29 of the valve chambers 18 and 19 or to the end compartments 30 and 31.

When the steam is to be supplied to the central compartments 29 it passes from the end compartment 50 of the reversing valve chamber into the end portion of the sleeve 51 and thence through ports 52, at a slight distance from the end of the sleeve into an annular chamber 53 surrounding the ports 52 and from the chamber 53 passes through ports 54 directly into the compartments 29. When the steam is to be directed to the end compartments 30 and 31 of the valve chambers 18 and 19, it passes from the opposite end compartment 49 into the adjacent end of the sleeve 51 and thence through ports 55 into an annular chamber 56 surrounding the ports 55. From the chamber 56, the steam passes through a vertical passageway 57, Fig. 5, into a chamber 58 extending lengthwise beneath the central reversing valve chamber and thence through ports 59 and 60, at each end, directly into the end compartments 30 and 31, respectively.

The steam is directed either through the ports 52 into the central compartments 29 or through the ports 55 to the end compartments 30 and 31 by means of the reversing valve 41, which is preferably formed of a pair of pistons 61 and 62 mounted on a rod 63 and so spaced thereon that, when one piston lies between the series of ports 52 or 55 and the adjacent end of the sleeve 51, the outer face of the other piston will just clear the nearer edge of the other set of ports 55 or 52, respectively. Accordingly, when the valve 41 is in its rearmost or foremost position, steam is shut off from one set of the valves 52 or 55 and supplied through the other set.

When one set of ports 52 or 55 is shut from communication with the end compartments 49 or 50, the other set of ports 55 or 52 communicates through the central portion of the sleeve 51 with a central set of ports 65 which open into a central annular chamber 66 opening directly into the exhaust nozzle 40. For this purpose the thickness of the valve pistons 61 and 62 is such that, in the rearmost and foremost positions of the valve 41, the inner edges of the pistons forming the interior of the valve 41 clear the outer edges of the central ports 65 and of either the ports 52 or 55, and thus place either one or the other of the ports 52 or 55 in communication with the exhaust nozzle 40. Through this arrangement, therefore, when the central compartment 29 is in communication with the steam supply the end compartments 30 and 31 are in communication with the exhaust nozzle, and when the end compartments are in communication with the steam supply the central compartment 29 is in communication with the exhaust nozzle, the interior of the valves 41, 16 and 17 communicating, the relation of the ports of valve chambers 18 and 19 to the steam supply and exhaust being thus reversed through the action of the piston valve 41 and the direction of movement of the locomotive being thus forward or reverse.

In the position of the valves shown in Fig. 8, the locomotive moves in reverse direction, the movements of the pistons 12 and 13 being opposite to each other. In this position of the valves, the path of the steam is as follows, the path of the steam being indicated by arrows in full lines and the path of the exhaust being indicated by arrows in broken lines. The steam passes from the end compartment 49 into the sleeve 51, thence through ports 55, annular chamber 56, vertical passage 57, Fig. 5, horizontal chamber 58 and ports 59 and 60 into the end compartments 30 and 31 of the slide valve chambers 18 and 19. From compartment 30 of chamber 18, the steam passes through passage 32 to one end of the cylinder 10 and from the compartment 31 of chamber 19, the steam passes through passage 33 to the opposite end of the cylinder 11. As the pistons 12 and 13 are forced by the steam to the opposite ends of their cylinders, exhaust steam is forced from the cylinder 10 through passage 33' into the central compartment 29 and exhaust steam is forced from the opposite end of the cylinder 11 through passage 32' into the corresponding central compartment 29. From the central compartments 29 the exhaust steam passes through ports 54, chambers 53 and ports 52 into the central portion of the sleeve 51 and through ports 65 into the annular chamber 66 and thence to the exhaust nozzle 40. When the reversing valve is moved to the opposite end of the sleeve 51, the live steam is admitted to the central compartment 29 and, with the same positions of the valves 16 and 17, the steam is admitted to the ends of the cylinders 10 and 11 opposite to that shown in Fig. 8 thus driving the pistons 12 and 13 in the opposite direction to that shown in Fig. 8 and thus in a forward direction. Correspondingly the exhaust flow of the steam is reversed. In this position of the valves, the directions of the arrows is reversed and the broken arrows would indicate live steam, and the full arrows, exhaust.

Through the above invention, therefore, a very simple valve and valve gear may be used for the admission and exhaust of steam and, by the addition of an additional valve, the driving of the locomotive in either direction is provided. The addition of the reversing valve may be easily and simply made by casting the requisite passages in the casting containing the slide valves in lieu of the usual supply and exhaust passages the various valve chambers being formed as cylindrical passages which may be easily machined and provided with the sleeves for the valves. These cylindrical passages are then closed by means of end closure plates 70 and 71 bolted to the end faces of the casting and provided with stuffing boxes 73 for the various valve rods.

As changes of construction could be made within the scope of my invention, it is intended that all the matter contained in the above description or shown in the accompanying drawings be interpreted as illustrative and not in a limiting sense.

Having described my invention, what I claim and desire to secure by Letters Patent is:

1. A locomotive valve gear which comprises, a pair of valves and valve chambers for the cylinders of the engine, of said locomotive, connecting rods for said valves driven directly from and in fixed relation to the driving axle of the locomotive, a control valve chamber between said valves, a steam supply chamber and an exhaust nozzle, one connecting with an upper central port of said control chamber and the other with a port at each end of said control valve chamber, a communicating chamber beneath said control valve chamber connected to opposite ends of each cylinder valve chamber and to said control valve chamber at one side of the upper central port, and a passage from the central portions of the cylinder valve chambers to the control valve chamber at the opposite side of said upper central port, a pair of valve pistons in said control valve chamber spaced to span the distance between said upper central port and one or the other of said connections, and means operable from the cab of the locomotive to move said valve pistons to connect said upper central port with one or the other of said connections.

2. A locomotive valve gear which comprises a pair of valves and valve chambers for the cylinders of said engine, connecting rods for said valves driven directly from and in fixed relation to the driving axle of the locomotive, a control valve chamber between said valves, an exhaust nozzle opening directly upwardly from the middle of said control valve chamber, a steam supply extending at one side of said control valve chamber and exhaust nozzle and connected to each end of said control valve chamber, a communicating chamber beneath said control valve chamber connected to opposite ends of each cylinder valve chamber and to said control valve chamber at one side of the exhaust nozzle, a passage from the central portions of the cylinder valve chambers to the control valve chamber at the opposite side of said exhaust nozzle, a pair of valve pistons in said control valve chamber spaced to span the distance between said exhaust nozzle and one or the other of said connections, and means operable from the cab of the locomotive to move said valve pistons to connect said exhaust nozzle with one or the other of said connections.

3. A locomotive valve gear which comprises, a casting comprising a pair of steam valve chambers, a common reversing valve chamber, an exhaust nozzle opening upwardly centrally therefrom, a communicating chamber therebeneath between said steam valve chambers and communicating with the steam valve chambers at the ends thereof and with the reversing valve chamber between the exhaust nozzle and one end thereof, and a passageway from the central portion of each steam valve chamber to said reversing valve chamber between the exhaust nozzle and the other end thereof, a valve in said steam valve chamber, connecting rods for said steam valves driven directly from the driving axle of the locomotive, and a valve in said reversing valve chamber operable from the cab of the locomotive to place said chamber and communicating passage in communication alternately with either said exhaust nozzle or said steam supply ends.

4. A locomotive valve gear comprising a casting having a pair of cylindrical steam valve passages therethrough and an upper cylindrical reversing valve passage therethrough midway of said steam valve passages, and having an exhaust nozzle projecting upwardly from the central portion of said reversing valve passage, a chamber between said steam valve passages beneath said reversing valve passage, and communicating with the ends of said steam valve passages and with the reversing valve passage adjacent said exhaust nozzle, a passage from the central portion of said steam valve passages to said reversing valve passage at the opposite side of said nozzle, a steam supply to the end portions of said reversing valve passages, and plates closing the ends of said passages.

ALEXANDER W. CARROLL.